United States Patent
Mayr et al.

(10) Patent No.: US 6,607,176 B1
(45) Date of Patent: Aug. 19, 2003

(54) PROPORTIONAL PRESSURE CONTROL VALVE

(75) Inventors: Karlheinz Mayr, Wasserburg (DE); Markus Eisele, Friedrichshafen (DE); Walter Kill, Friedrichshafen (DE); Michael Weber, Waldburg (DE); Hubert Remmlinger, Friedrichshafen (DE); Jochen Fischer, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/868,588

(22) PCT Filed: Jan. 29, 2001

(86) PCT No.: PCT/EP00/00717

§ 371 (c)(1), (2), (4) Date: Jun. 20, 2001

(87) PCT Pub. No.: WO00/46647

PCT Pub. Date: Aug. 10, 2000

(30) Foreign Application Priority Data

Feb. 6, 1999 (DE) .......................................... 199 04 902

(51) Int. Cl.⁷ .............................................. F16K 31/02
(52) U.S. Cl. .............................. 251/129.08; 251/129.16
(58) Field of Search ........................ 251/129.08, 129.16; 137/625.65

(56) References Cited

U.S. PATENT DOCUMENTS

| | | | | |
|---|---|---|---|---|
| 4,251,051 A | * | 2/1981 | Quenneville et al. .. | 251/129.16 |
| 4,662,605 A | * | 5/1987 | Garcia ................. | 251/129.08 |
| 5,031,663 A | * | 7/1991 | Fukuta et al. ......... | 137/625.64 |
| 5,197,507 A | * | 3/1993 | Miki et al. ........... | 137/625.65 |
| 5,259,414 A | * | 11/1993 | Suzuki ................. | 137/625.65 |
| 5,503,364 A | * | 4/1996 | Enomoto et al. ...... | 251/129.16 |
| 5,513,673 A | * | 5/1996 | Slavin et al. .......... | 137/625.65 |
| 5,547,165 A | | 8/1996 | Brehm et al. .......... | 251/129.16 |
| 5,848,613 A | * | 12/1998 | Sakaguchi et al. ..... | 137/625.65 |

FOREIGN PATENT DOCUMENTS

| | | | |
|---|---|---|---|
| DE | 35 06 053 A1 | 8/1986 | ............. H01F/7/16 |
| DE | 37 20 347 A1 | 1/1988 | ........... F15B/11/02 |
| DE | 41 22 259 A1 | 1/1993 | ............. H01F/7/18 |
| DE | 43 26 507 C2 | 6/1996 | ......... F15B/13/044 |
| EP | 0 466 985 A1 | 7/1990 | ............. H01F/7/13 |
| FR | 2 502 385 | 9/1982 | ............. H01F/7/16 |

OTHER PUBLICATIONS

Mannesman–RexRoth, "Fluid Technology from A to Z—The Hydraulic Trainer", vol. 5, May 1995, p. 266.

* cited by examiner

*Primary Examiner*—Gene Mancene
*Assistant Examiner*—John Bastianelli
(74) *Attorney, Agent, or Firm*—Davis & Bujold, P.L.L.C.

(57) ABSTRACT

A proportional pressure control valve serves as a direct control valve with a pressure reducing function and a pressure holding function. The valve, includes a valve housing (2) with inlet and outlet . ports (4, 5, 6), a control element (7) which has a feedback facility, an armature rod (15) and a proportional magnet (3). The proportional magnet is comprised of a magnet core (17), a magnet armature (16) and a magnet coil (18), wherein this proportional magnet (3) in its operational range possesses a nearly constant magnetic force. In accordance with the invention, in a holding position of the magnet armature (16), the smallest axial space (21) between the magnet armature (16) and the magnet core (17) is so dimensioned, first, that the magnetic force between these two components (16, 17) when in the holding position is greater than the magnetic force in the operational zone of the proportional magnets (3), and second, that the magnet armature (16) can be fixed in the holding position by this magnetic force.

18 Claims, 6 Drawing Sheets

PROPORTIONAL PRESSURE CONTROL VALVE

FIELD OF THE INVENTION

The invention concerns a proportional, pressure control valve, with functions for pressure reducing and for the maintenance of a given pressure. The valve is comprised, essentially, of a valve housing, with entry and exit ports, a control element for the opening and closing of an orifice type opening, an armature rod with an armature axis for the connection of the control element with a proportional magnet. The proportional magnet is an assembly of a magnet core, a magnetic armature rod and a magnet coil. The magnet armature is movable, back and forth, between two end positions in the direction of the armature axis. In this situation, the first end position represents a stop position of the, magnet, wherein the magnet armature holds the control element immobile in this position.

BACKGROUND OF THE INVENTION

Valves of the above described construction are, in manifold forms, known within the state of the technology. These valves are, for one instance, applied as direct control valves for the regulation of clutches in automatic motor vehicle gear shifting transmissions. Where commercial vehicles were concerned, in such transmissions, the principal hydraulic pressure, otherwise (and hereinafter) known as the "system pressure", runs about 24 bar. This system pressure is commonly, by means of a pressure reduction valve, reduced to a pilot control level, to which the proportional pressure control valve is subjected. In order to hold this valve closed, following the engagement of a clutch, normally an elevated safety pressure, which approximates the said system pressure, is applied to the clutch cylinder, and held at this level, for instance, by means of additional check valves. The operation of this arrangement, demands, for one clutch in an automatic transmission, the installation of up to three valves, namely, a proportional pressure control valve, a pressure reducing valve, and a check valve.

SUMMARY OF THE INVENTION

The purpose of the present invention is to make available a valve, which fulfills the above named functions, but has a simpler construction achieved by fewer components, and accordingly, is less expensive in its manufacture.

In accord with the invention, this purpose is achieved, in that, with a proportional pressure control valve of the aforesaid type of construction, and when in the pressure holding position of the magnet armature, the smallest possible axial distance is so measured between the two opposingly situated end surfaces of the magnet armature and the magnet core, that the magnetic force between the magnet armature and the magnet core., in this said holding position, is greater than the magnetic force in the operational area of the proportional magnets and that, the mag net armature, by means of the increased magnetic force, can be fixed in this position. The invention advantageously makes use of this situation, in that a proportional magnet, in its operational range, exhibits a nearly horizontal force stroke characteristic line and the magnetic force, in a zone below the level of a defined stroke, that is, a distance between magnet armature and magnet core, climbs rapidly as compared to the said magnetic force in its operational range. For the state of the technology, refer also to Mannesman-RexRoth, (German text), "Fluid Technologyfrom A to Z—The Hydraulic Trainer", Vol. 5, May 1995. page 266. By means of these magnetic characteristics with large magnetic forces at very small air gap distances it becomes possible, with the proper magnet design, to energize a coil current, i.e. a "snap current", with which the operational zone of the magnet is overridden and the magnet armature is held in the zone of the high magnetic force. By means of the connection of the magnet armature through its armature rod with the control element, in this way, the holding force of the control element is increased to such a level, that this element, even when subjected to continuous system pressure of 24 bar, remains reliably in its holding position. This is because the hydraulic force, which acts in one direction of the control element is less than the magnetic force which opposes it.

The valve is additionally constructed in such a way, that in the holding position, advantageously the inlet port to the valve and the service connection to the clutch are both open and the hydraulic system pressure, to its greatest extent, is exerted against the said clutch. On this account, and with the proportional pressure control valve of the invention, both the pressure reducing valve as well as the pressure holding valve can advantageously be dispensed with. This is because the functions of these valves have been replaced by the invented valve. Furthermore, a controller of this kind, advantageously possesses a high pressure to coil current (pI) resolution in its fine adjustment range between 0 and 12 bar. Further, the invented holding function enables, advantageously, the blocking of oscillating masses in the pressure control arrangement, whereby an increased vibration stability along with a reduced mechanical ablation is achieved.

In a preferred development of the invention, the control element exhibits three control edges. This control element is designed as a double action piston with two sliding edges and one additional tight seat. The surface of said seat extends itself in a radial direction relative to the longitudinal axis of the control element. In this way and in a very simple manner, is achieved an economical construction of a 3/2-way pressure regulator, serving as a direct control valve with a magnetic holding function of the magnet armature in zero-flow design (ZF), wherein the radial seat is provided for the fulfillment of an improved sealing function, namely zero flow in respect to leakage flow.

In a shut-off development of the invention, the proposal is made, that the control element, i.e. the said valve piston, is provided with an internal pressure feedback. This is created, in that the double action piston possesses a piston boring with a damping element, for instance, a damping plunger, whereby, advantageously, an additional damping function is made possible. The double action piston, the armature rod, the magnet armature, the magnet core and the valve housing, in regard to their axial length, are so well integrated, and the fastenings of the double action piston, of the armature and armature rod are chosen in such a manner relative to the magnet core, so that the smallest axial space between the magnet core and the magnet armature lies in a range of 0 to 0.3 mm, preferably ca. $\leq 0.1$ mm.

At this spacing, the magnetic force is sufficiently elevated above the magnet force in the operational area, so that the magnet armature and therewith also the double action piston, by means of the available hydraulic system pressure are advantageously held in their end position.

Alternative to the above described realization of the smallest possible spacing between the magnet core and the magnet armature, in a particularly advantageous design of the invention, a spacer disk made of non-magnetic material is placed between the magnet core and the magnet armature.

By means of such a disk, which prevents a "magnetic adherency" of the magnetic armature onto the magnetic core, by means of varied designs of the disk thickness, favorably, a simple adjustability of the magnetic force becomes possible. Alternative to the spacer disk, a non-magnetic coating on the magnet core and/or on the magnet armature can be provided to maintain the desired axial air gap.

In an advantageous construction of the pressure control valve, the distance between the two end surfaces of the magnet core and the magnet armature runs some 0.01 to 0.3 mm, although this is preferred to be $\leq 0.1$ mm.

In yet another alternative design of the already described proportional magnets, the armature rod is installed to be axially slidable in the magnet armature and is subjected to the force of a compression spring.

Advantageously, the compression spring possesses a spring force, which is equal to, or greater than the maximal hydraulic control force on the double acting piston and thus exerts the spring force through the armature rod in a contrary direction.

In another development, the proposal is, that the compression spring possess the least possible spring rate, which is so measured out, that even in the case of a small coil current, the magnet armature can be brought into the area of higher magnetic forces, and thereby the holding function can be realized.

In a special development of the invention, it is proposed, that the armature rod possess an axial detent surface, which is situated, so that if the armature finds itself in the proportional area of the magnet, the detent surface projects by a defined distance over that end surface of the magnet armature which is proximal to the magnet core. Thereby, the advantageous achievement is, that the magnet armature in the proportional area does not move into the area of high magnetic forces, since the armature rod, with its detent surface comes to rest on the end surface of the magnet core, and the said magnet core must, on this account, remain separated. The compression spring, placed in series with the armature rod, makes possible thus, a snap protection without loss of magnetic force, since the already stressed spring exceeds the hydraulic-magnetic forces, as long as these are less than the preloaded force of the compression spring. If, it should so happen, in the pressure control or proportional zone of the magnet armature comes to a critical operational condition, for instance, a system pressure breakage, then the armature moves itself immediately in the direction of the magnet core. A move of this kind is terminated by the said detent surface of the armature rod, as long as the proportional magnet is still located in its proportional operational area and thus the magnet armature remains at a distance from the magnet core.

Should there be need for the magnet armature to controllably enter the hold situation, by means of an increase in the coil current for a short period, the magnetic force is brought to a value higher than that of the maximum hydraulic control force. In accord with this, the spring packet is further compressed, until the end surface of the magnet armature moves along with the detent surface of the armature rod, and in this way can be brought into the magnetic holding area.

In a further development of the invention, it is proposed, that the magnet coil be connected with an electrical control apparatus, which, in specifiable, periodic intervals, emits a current impulse to the magnet coil for the maintenance of the holding position.

In this way, assurance is provided, that the magnet armature retains its holding position relative to the magnet core and does not unexpectedly drop out of the holding position and that advantageously, the control element reliably remains in its own holding position.

It has shown itself as being of advantage, if the current impulse possesses sufficient strength, which corresponds to a snap current and is greater than the holding current of the magnet coil and for instance, measures about 950 mA and; that the current impulses occurs in time periods of, for example, 20 ms. The valve design should, ideally, be so conceived, that upon unexpected drop outs, the switching elements nevertheless remain in the closed position, that is, for example, the control pressure remains at 12 bar.

For the intended release of the magnet armature from the holding position, the magnet coil is subjected to an electrical control signal, which, for instance, is carried out as a reduction and then subsequent increase (loop control) of the control current in the magnet coil. In this way, and in a simple manner, an elegant means of a release of the armature can be effected.

As an alternative, a voluntary release of the magnet armature from its holding position can be accomplished by an increase of the hydraulic system pressure to a value above the holding pressure.

In this case, the pressure increase acts, for example, on the feedback and especially on the end of the piston boring. In this way, and in an advantageous manner, by means of a movement of the armature rod, a release of the magnet armature from the magnet core is achieved.

In an advantageous manner, the invented proportional pressure regulating valve is employed as a direct control valve. When this is done, the valve is preferably designed as a 3/2-way proportional pressure valve with a magnetic holding function of the magnet armature, so that, when the invented valve is used, then both a pressure reducing valve as well as a pressure holding valve can be done away with.

BRIEF DESCRIPTION OF THE DRAWINGS

Further aims, features, advantages and application possibilities of the invention arise from the following description of embodiment examples, which are more closely detailed in the drawings. Thereby, all described and/or illustratively presented features, alone, or in optional combination, form the object of the invention, independently of their condensations in the claims or their references to antecedent claims. There is shown in:

DETAILED DESCRIPTION OF THE INVENTION

The pressure regulating valve 1 (FIG. 1) consists, essentially, of a valve housing 2 having inlet and outlet ports 4, 5, 6 and a proportional magnet 3.

Figure 1:
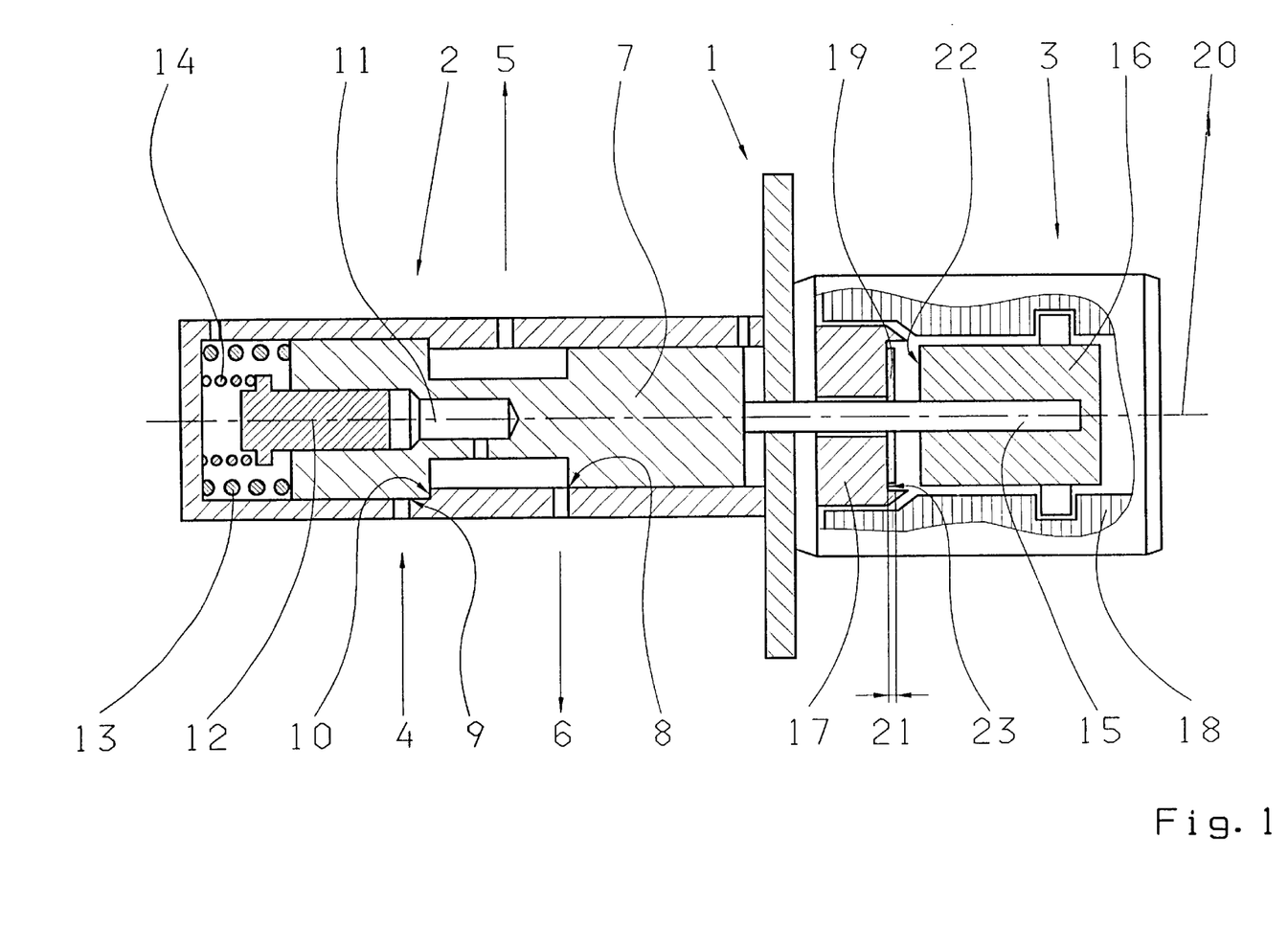
FIG. 1 in longitudinal section, a 3/2 way proportional pressure regulator valve serving as a direct control valve with a magnetic holding function of the magnet armature, FIG. 2 in a schematic presentation, a characteristic curve of the pressure p plotted against the coil current I for an invented valve with said holding function, FIG. 3 in schematic presentation, a characteristic curve of the pressure p and the coil current I against the time t, FIG. 4 an explanatory diagram presenting a characteristic curve for the function of the pressure p and the coil current I plotted against the time t, FIG. 5 in schematic presentation, a magnetic force stroke curve of a proportional magnet, and FIG. 6 in a section presentation, an alternative design of a proportional magnet with a compression spring serving as a snap protection.

A control element 7, which is designed as a double action piston, is connected with an armature rod 15 for the opening and closing movements of its control edges 8, 9 as well as for operation of the valve seat 10. The armature rod 15 is aligned along the axis 20 of armature 16, to which said armature it is also affixed. The magnet armature 16 forms, together with the magnet core 17 and a magnet coil 18 the proportional magnet 3.

The magnet armature 16 is presented in its "upper" position, restrained by its detents. This position is designated as its second "end position" in which, the gap 21 between the end surface 22 of the magnet armature 16 and the end surface 23 of the magnet core 17 is at its maximum.

In the double acting piston 7, on that end thereof which is situated opposite to the armature rod 15, is provided, for the purpose of pressure feedback, a piston boring 11, into which a damping piston 12 penetrates. The damping piston 12 is subjected to the force of a compression spring 14. The double acting piston 7 responds to another compression spring 13.

The double acting piston 7 exhibits three control edges, whereby the edges 8 and 9 are designed as sliding edges. These edges 8 and 9 essentially open and close the inlet and outlet ports. An additional edge is designated as 10 and it serves as a valve seat and has a sealing surface radially oriented in respect to the armature axis 20. In the case of a closed inlet port 4, this sealing surface nearly totally prevents valve leakage. The design presented in FIG. 1 of the pressure control valve, on this account, is designated as a Zero Flow (ZF) construction.

By increasing the coil current, the magnet armature 16 is moved toward the magnet core 17. As this is done, simultaneously, the double action piston 7 moves downward against the force of the compression spring 13, whereby the surface of edge 10 releases itself from its seat, as the control edge 9 is opening the intake port. In the holding position of the invention, which, for the sake of simplicity is not shown, the magnet armature 16 seats itself on the spacer disk 19, the intake port 4 is fully open and in the piston boring 11, the pressure feedback applies the principal hydraulic pressure p. This pressure p acts on the "upper" end surface of the piston boring 11 against the magnetic holding force of the armature 16.

After the release of the magnet armature 16 from the magnet core 17, for instance, by reducing the coil current, the armature 16 snaps out of its hold position and moves itself in the direction of the end position which is shown in FIG. 1 as the end position.

The capture of the pressure, as is described in the following, at a time before the end position as shown in FIG. 1 is reached, is essential for the function.

A release of the magnet armature, which means the release of the double action piston 7 out of its holding position, can be carried out differently in such a way, that the system hydraulic pressure is increased to such a measure, so that the force, which in the piston boring 11 acts "upward", becomes greater than the magnetic force of the proportional magnet 3 which opposes it.

In the course of an increase of the coil current I (FIG. 2), at first an essentially linear increase of the control pressure occurs as current increases up to the point of reaching a critical snap current value, at about 800 mA. At this current level, the pressure curve jumps vertically upward without current increase to the hydraulic system pressure of 24 bar. At reaching this system pressure, except for a short override, no change in pressure occurs in spite of further increase in coil current.

Figure 2:
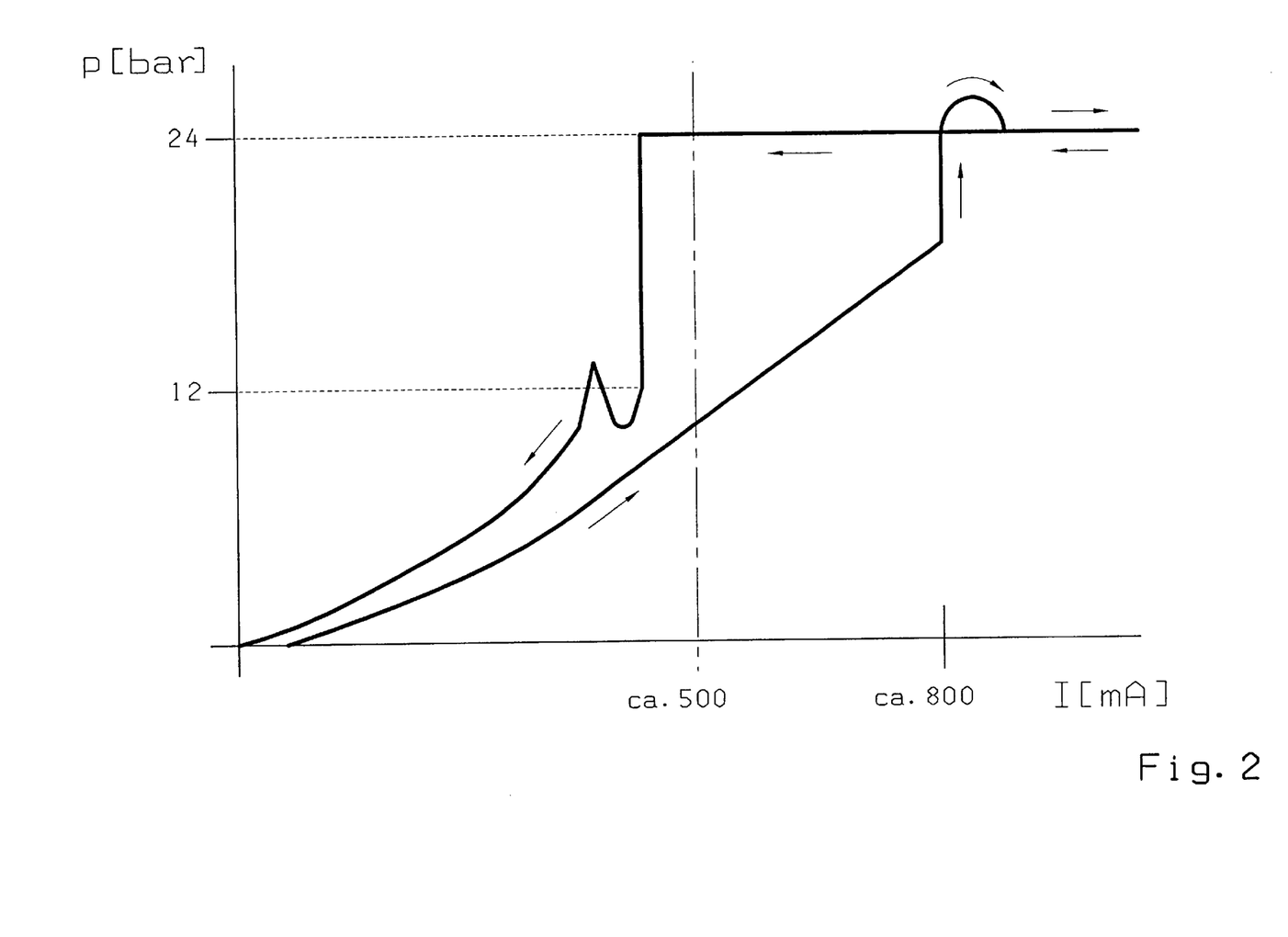

Upon decreasing the coil current I to a value of about 500 mA, the system pressure of 24 bar remains at first, constant at that value. Only by going below a certain value of the coil current, which is less than about 500 mA, does the magnet armature snap out of its hold position. By means of the intended capture of the valve, the control pressure again exhibits a sudden drop from the system pressure to, for instance, a discontinuity at 12 bar. Upon further reduction of the coil current I, the decline of the pressure curve is carried on in an essentially linear reduction of the system pressure p to 0 bar.

By means of a linear increase of the coil current I (FIG. 3), there follows at essentially the same time, a linear increase of the pressure p up to a value of about 12 bar. Subsequently, a discontinuous snap occurs in the curves of both the coil current and the pressure p, that is, up to a value of about 1000 mA current and a pressure of 24 bar.

Figure 3:
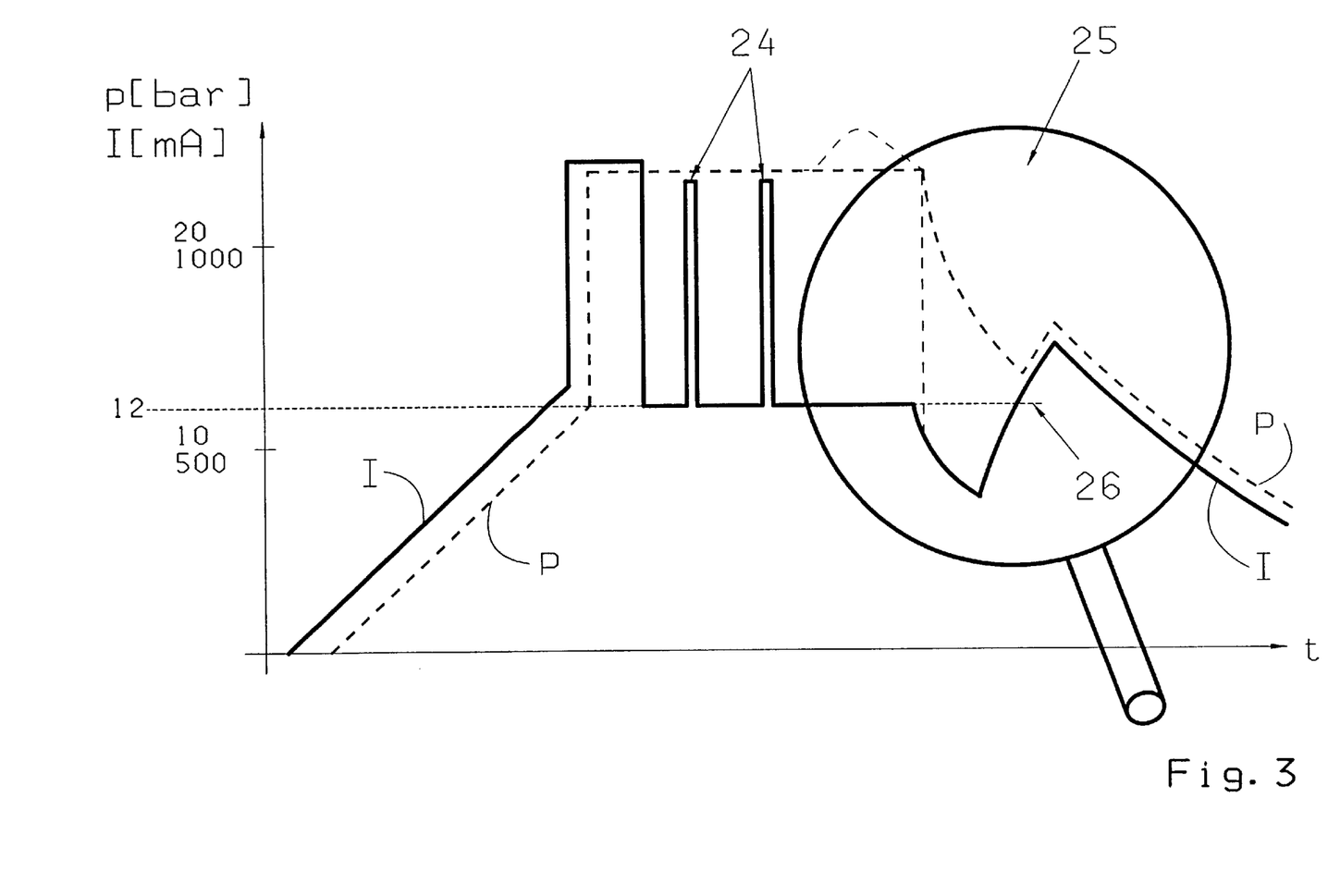

Up to the time when the curves attain the character shown in the imaginary magnifying glass 25, the pressure p can be held constant at the value of 24 bar although during this time the coil current undergoes current impulses, so called "refreshment peaks" which contribute to the maintenance of the holding function. The said impulses, or peaks, repeat themselves in short time periods of, for instance, 20 ms.

In the magnified (25) depiction of time, which corresponds to a period of ca. 50 ms, first the current drops to a value less than 500 mA, whereupon the pressure p declines from its maximum value of 24 bar. By means of a subsequent increasing of the coil current I, the curve of the pressure p above the holding level of ca. 12 bar is again "captured" (loop control). By a subsequent reduction of the coil current I, there occurs within the same time, a reduction of the system pressure p.

Figure 4:
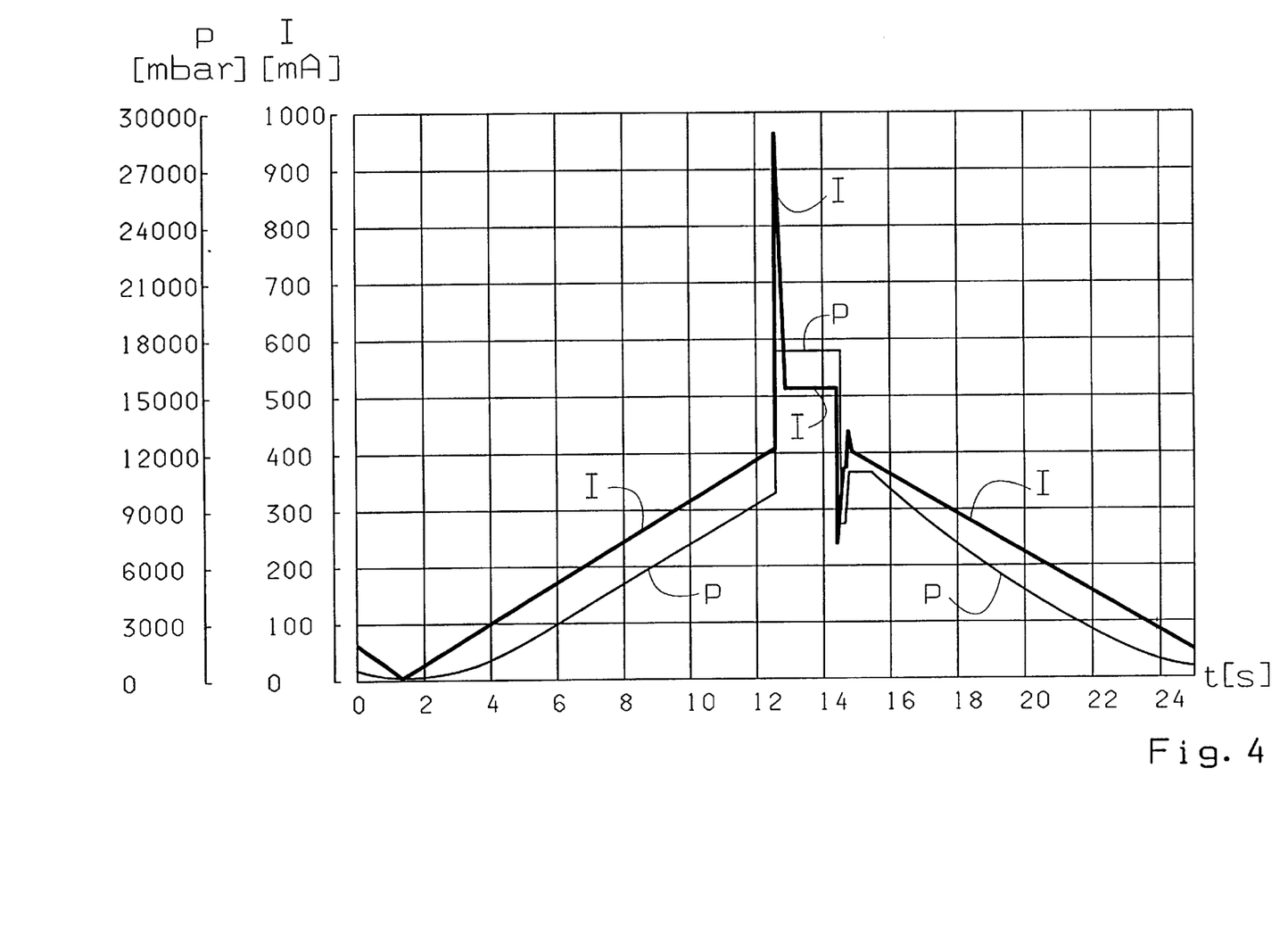

In the characterization curve of FIG. 4, which, can be taken as an explanatory guide diagram, it is evident, that the pressure curve p runs essentially parallel to the course of the coil current I. In this diagram, during the first 12 seconds, both pressure and current curves increase essentially in a linear manner. Following a peaking, both the pressure and the current remains at generally constant values, until after fifteen seconds, an essentially linear and parallel reduction of both the pressure and the current occurs.

Figure 5:
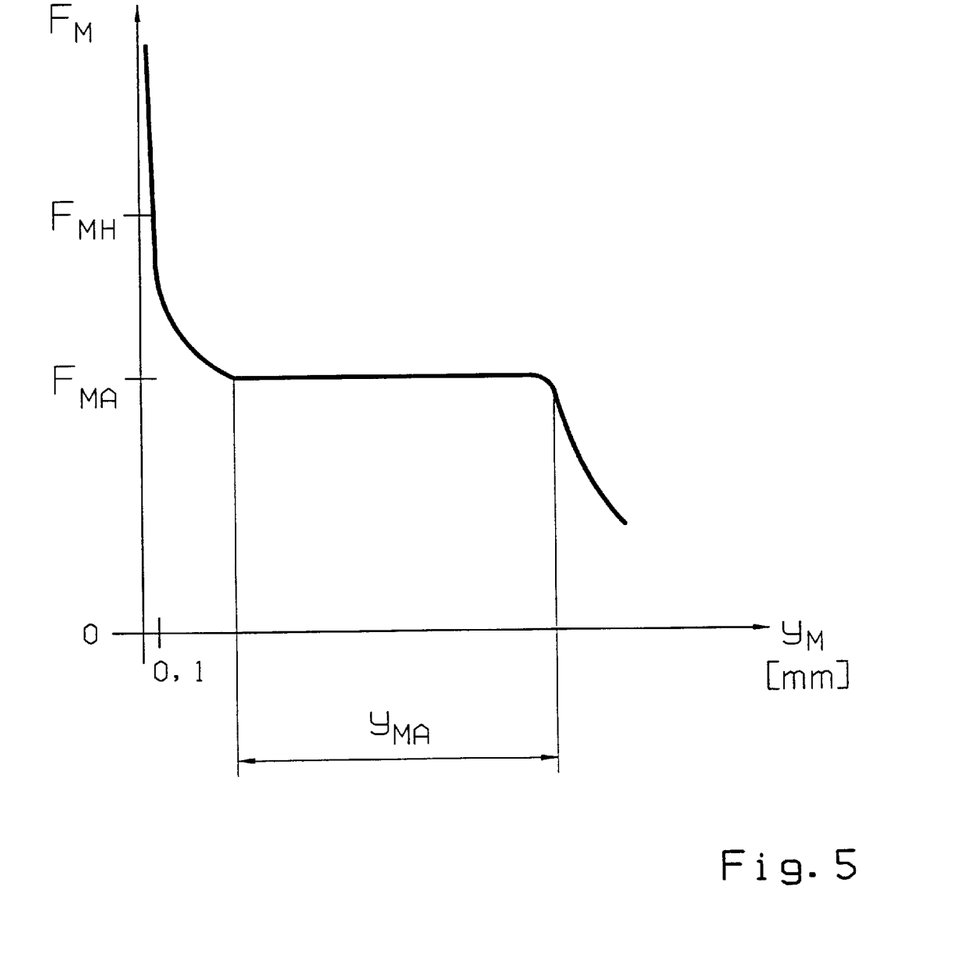

As has been mentioned at the start, one may assume from the state of the technology, (FIG. 5), that a proportional magnet, in its operational zone $Y_{MA}$ follows a nearly horizontal force-stroke characteristic line. In the operational zone $Y_{MA}$, the magnet force $F_{MA}$ is accordingly constant. Upon further increasing stroke $Y_M$, the magnetic force $F_M$ diminishes. Upon declining, that is, lesser stroke $Y_M$, then the magnetic force $F_M$ steeply increases. At a stroke of $Y_M$ of 0.1 mm, the magnetic force $F_{MH}$ exhibits in the holding zone, a significantly higher value than the magnetic force $F_{MA}$ in the operational zone. The invention makes use of this characteristic, in that the magnet armature of the proportional magnet, by means of a current increase in the magnet coil, is drawn to the magnet core, and thus brings about a stable holding position of the said magnet armature.

Figure 6:
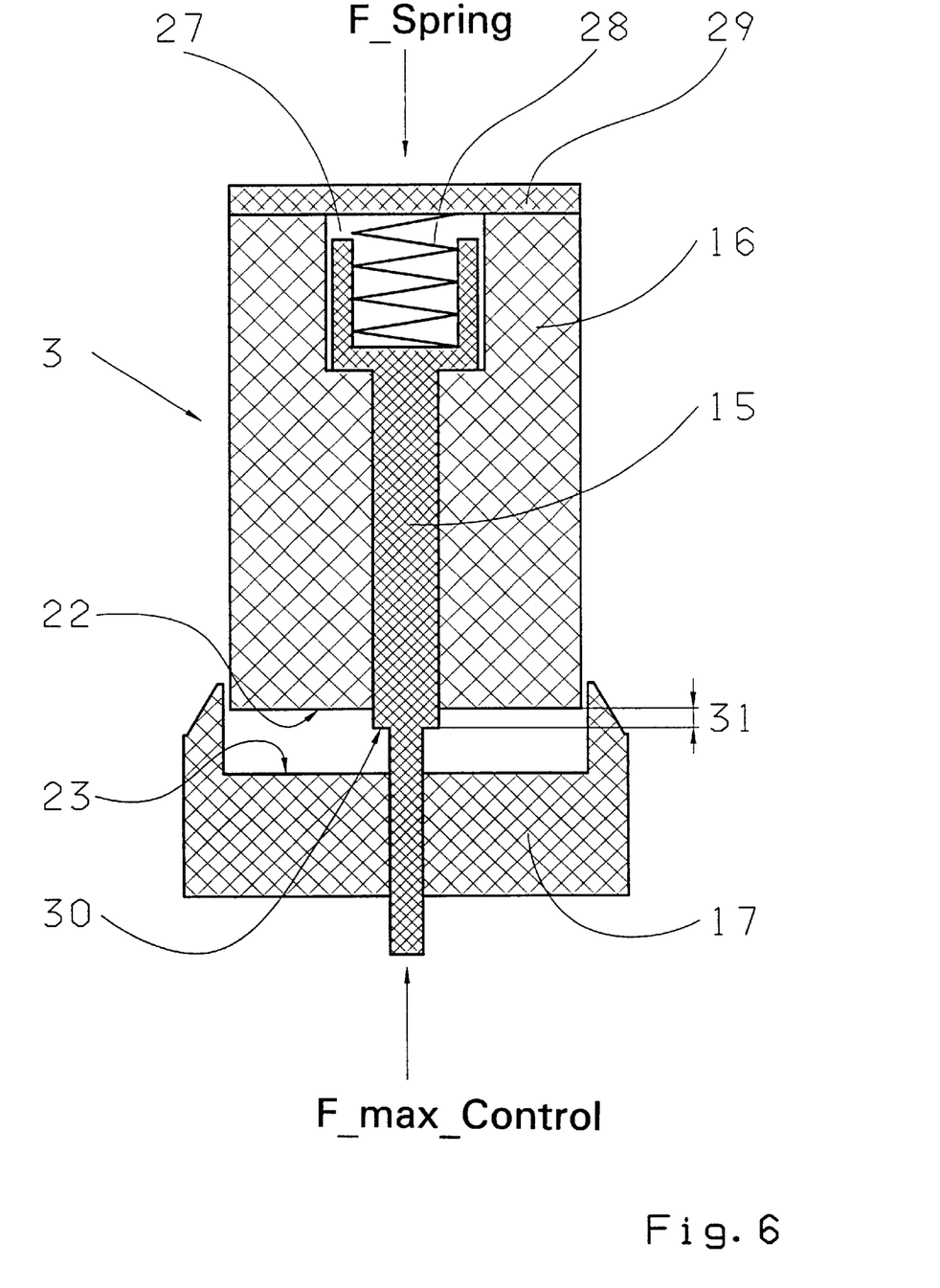

Alternative to the design of the proportional magnet in accord with FIG. 1, in FIG. 6 a proportional magnet with an integral holding function as well as a sudden snap protection is presented. (The same components in the figures are provided with the same reference numbers.) The proportional magnet 3 with the snap protection, is essentially comprised of a magnet armature 16 with a stepped boring 27 in which an armature rod 15 with varied diameters is inserted.

This armature rod 15 possesses—in interest of simplicity, not shown—on its end remote from the valve part, a potlike part into which a compression spring 28 is placed. This compression spring 28 is held in the armature 16 under prestress, by means of a closure disk 29. By means of the compression spring 28, again, in turn, a prestressed force is exerted on the armature rod 15 in the direction of the hydraulic valve part.

The armature rod 15 possesses further, an annular detent surface 30, which is so positioned, that as long as the magnet armature remains in the proportional positioning, this detent surface 30 protrudes a distance 31 out from the end surface 22 of the armature 16. Upon electrical controlling, the magnet armature enters into the magnet core 17, until the said detent surface abuts the end surface 23 of the core 17. The said prestressed spring 28 overcomes the hydraulic-magnetic forces, as long as these are less than the prestress force of the spring 28. If, contrary to this, a critical operation condition arises in the pressure control or proportional area of the magnet, for instance, a hydraulic system pressure failure, and the armature 16 moves itself in the direction of the magnet core 17, then this movement is terminated by the detent at distance 31. The proportional magnet finds itself, advantageously, still in its proportional working area. A proportional magnet designed in this manner, allows a pressure/current "snap" to occur without the loss of magnetic force.

During operation, in order to move the magnet armature 16, nevertheless, into the holding position, for a brief period, a magnetic force is produced by an increase in the coil current.

This force level lies above the maximum, hydraulic control force $F_{max\text{-}control}$, so that this force, together with the compression spring 28, propels the magnet armature 16 with the detent surface 30 and thus the magnet armature 16 moves into the magnetic holding area of the magnet core 17.

Reference Numbers and Symbols 1 pressure control valve
2 valve housing
3 proportional magnet
4 inlet port
5 connection port for operations
6 outlet port
7 control element/double acting piston
8 control edge
9 control edge
10 radial valve seat
11 piston boring
12 damping piston
13 compression spring for 7
14 compression spring for 12
15 armature rod
16 magnet armature
17 magnet core
18 magnet coil
19 spacer disk
20 axis of magnet armature 16
21 space between armature and core
22 end surface, armature
23 end surface, core
24 current impulse
25 time window (magnifying glass)
26 holding level
27 boring (FIG. 6)
28 compression spring
29 closure cap (FIG. 6)
30 detent surface, annular
31 space between armature and core
$F_M$=magnetic force
$F_{MH}$=magnetic force, holding zone
$F_{MA}$=magnetic force, operational area
$F_{SPRING}$=spring force
$F_{MAX\ CONTROL}$=max hydraulic control force
$Y_M$=magnet stroke
$Y_{MA}$=operational area
p=pressure
I=current
Q=through-flow
C=spring rate

What is claimed is:

1. A proportional pressure control valve comprising:
    a valve housing (2) with inlet and outlet ports (4, 5, 6),
    a control element (7) with control surfaces (8, 9) for the opening and, closing of port openings,
    a proportional magnet (3) having an armature rod (15) connected with the control element (7) aligned along an armature axis (20), a magnet core (17), a magnet armature (16) and a magnet coil (18), and the magnet armature (16) is movable back and forth along the armature axis: (20);
    a first position where the proportional magnet (3) exerts in an operational range ($Y_{MA}$) a nearly constant first proportional magnetic force ($F_{MA}$) on the magnet armature to provide for the relative movement of the magnet armature along the armature axis (20);
    a second position where the magnet armature (16) is located at a smallest axial distance (21) to the magnet core (17) and a second magnetic holding force ($F_{MH}$),is generated between the magnet armature (16) and the magnet core (17) which is greater than the first proportional magnetic force ($F_{MA}$) in the operational range ($Y_{MA}$) of the proportional magnet (3), and the magnet armature (16), by means of the second magnetic holding force ($F_{MH}$), is maintained in the second position.

2. The proportional pressure control valve as set forth in claim 1 wherein the control element (7) is a double acting piston comprising three control surfaces being a first and a second sliding surfaces (8, 9) and, additionally a valve seat surface (10) extending radially relative to a longitudinal axis of the control element (7).

3. The proportional pressure control valve as set forth in claim 2 wherein the double action piston (7) further comprises a piston boring (11) with a damping piston(12) providing an internal feedback for the stabilization of a control circuit for the magnetic and hydraulic forces acting on the double acting piston.

4. The proportional pressure control valve as set forth in claim 2, wherein the axial lengths of: the double acting piston (7), the armature rod (15), the magnet armature (16), the magnet core (17) and the valve housing (2) are so dimensioned, that in the second position, and the axial space (21) between the magnet armature (16) and the magnet core (17) is 0.3 mm or less.

5. The proportional pressure control valve as set forth in claim 1, wherein one of a spacer disk (19) made of a non-magnetic material is positioned between the magnet core (17) and the magnet armature, and a non-magnetic coating is applied to one of the magnet core (17) and the magnet armature for the maintenance of the smallest axial distance (21).

6. The proportional pressure control valve as set forth in claim 5, wherein the smallest axial distance between end surfaces of the magnet core, (17) and the magnet armature (16) measures 0.3 mm or less.

7. The proportional pressure control valve as set forth in claim 2, wherein the armature rod (15) is inserted in the magnet armature (16) in an axial slidable manner and is prestressed by means of a compression spring (28).

8. The proportional pressure control valve in accordance with claim 7, wherein the compression spring (28) exerts on the double acting piston (7) a spring force ($F_{SPRING}$) which is greater or equal to a maximum hydraulic control force ($F_{MAX-CONTROL}$).

9. The proportional pressure control valve as set forth in claim 7, wherein the compression spring (28) has a least possible spring rate (C) such that even at a very small coil current (I), the magnet armature (16) can be brought into the range of the second higher magnetic force ($F_{MH}$) and thereby maintained in the second position.

10. The proportional pressure control valve as set forth in claim 7, wherein the arm rod (15) comprises an radial detent surface (30) which is so dispose that in the proportional zone of the magnets (3), the detent surface (30) which protrudes beyond the magnet armature (16) toward the facing end surface (22) of the magnet core (17) by a space (31), so that the magnet armature (16) enters the proportional positional zone but does not intrude into the zone, of high magnetic forces ($F_{MH}$).

11. The proportional pressure control valve as set forth in claim 10, wherein the magnet force ($F_M$) by means of an increase of the coil current (I) is raised to a value ($F_{MH}$) greater than the Maximum, hydraulic control force ($F_{MAX-CONTROL}$) the spring force, ($F_{SPRING}$) of the compression spring (28) is overcome and the end surface (22) of the magnet armature (16) can be moved away and upward from the detent surface (30) and the magnet armature (16) can thus be brought into the magnetic holding position.

12. The proportional pressure control valve as set forth in claim 1, wherein the magnet coil (18) is connected to an electrical control apparatus, which, in specified time related intervals, emits a current impulse to the magnet coil (18) for the maintenance of the holding position of the magnet armature (16).

13. The proportional pressure control valve as set forth in claim 7, wherein the current impulse has a current strength, which corresponds to a "snap" current and this runs ca. 950 mA and in that the current impulse is released sequentially in time related intervals of, for instance, ca. 20 ms.

14. The proportional pressure control valve as set forth in claim 1, wherein for the release of the magnet armature (16) from the holding position, the magnet coil (18) receives an electrical control signal, which, for instance, is made as a loop control by the reducing and subsequent increasing of the control current to the magnet coil (18).

15. The proportional pressure control valve as set forth in claim 1, wherein for the release of the magnet armature (16) from the holding position, a pressure signal is given, which, for instance is made as an increase of the hydraulic system pressure and to a value above that of the holding pressure, and the pressure increase acts particularly against the end surface of the piston boring (11).

16. The proportisure control valve as set forth in claim 1, characterized by the use of a direct control valve.

17. A proportional pressure control valve for regulation of clutches in an automatic transmission of an automobile, the pressure control valve comprising:

a valve housing (2) with inlet and outlet ports (4, 5, 6), a control element (7) with control surfaces (8, 9) for the opening and closing of port openings, a proportional magnet (3) having an armature rod (15) connected with the control element (7) aligned along an armature axis (20), a magnet core (17), a magnet armature (16) and a magnet coil (18), and the magnet armature (16) is movable back and forth along the armature axis (20);

a first position where the proportional magnet (3) exerts in an operational range ($Y_{MA}$) a nearly constant first proportional magnetic force ($F_{MA}$) on the magnet armature to provide for the relative movement of the magnet armature along the armature axis (20);

a second position where the magnet armature (16) is located at a smallest axial distance of about 0.1 and 0.3 mm (21) to the magnet core (17) and a second magnetic holding force ($F_{MH}$), is generated between the magnet armature (16) and the magnet core (17) which is greater than the first proportional magnetic force ($F_{MA}$) in the operational range ($Y_{MA}$) of the proportional magnet (3), and the magnet armature (16), by means of the second magnetic holding force ($F_{MH}$), is maintained in the second position.

18. A proportional pressure control valve comprising:

a valve housing (2) with inlet and outlet ports (4, 5, 6), a control element (7) With control surfaces (8, 9) for the opening and closing of port openings, a proportional magnet (3) having an armature rod (15) connected with the control element (7) aligned along an armature axis (20), a magnet core (17), a magnet armature (16) and a magnet coil (18), and the magnet armature (16) is movable back and forth along the armature axis (20);

a first position where the proportional magnet (3) exerts in an operational range ($Y_{MA}$) a substantially linear first proportional magnetic force ($F_{MA}$) on the magnet armature to provide for the relative movement of the magnet armature along the armature axis (20);

a second position where the magnet armature (16) is located at a smallest axial distance (21) to the magnet core (17) and a second substantially non-linear magnetic holding force ($F_{MH}$), is generated between the magnet armature (16) and the magnet core (17) which is greater than the first proportional magnetic force ($F_{MA}$) in the operational range ($Y_{MA}$) of the proportional magnet (3), and the magnet armature (16), by means of the second magnetic holding force ($F_{MH}$), is maintained in the second position.

* * * * *